(No Model.)
W. A. GALBRAITH.
RATCHET WASHER FOR BOLT NUTS.
No. 474,731. Patented May 10, 1892.
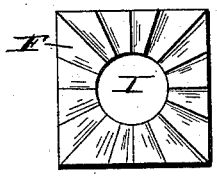
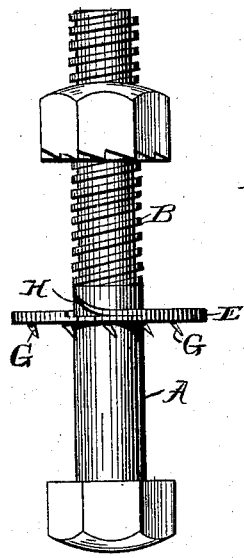
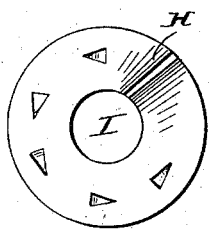
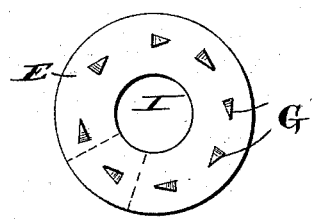
WITNESSES
A. J. Schwartz
C. S. Frye
Wm A. Galbraith
INVENTOR
By W. J. Fitzgerald
Associate Attorney.

UNITED STATES PATENT OFFICE.

WILLIAM A. GALBRAITH, OF SAN DIEGO, CALIFORNIA.

RATCHET-WASHER FOR BOLT-NUTS.

SPECIFICATION forming part of Letters Patent No. 474,731, dated May 10, 1892.

Application filed February 9, 1891. Serial No. 380,742. (No model.)

*To all whom it may concern:*

Be it known that I, WILLIAM A. GALBRAITH, a citizen of the United States, residing at San Diego, in the county of San Diego and State of California, have invented certain new and useful Improvements in Ratchet-Washers for Bolt-Nuts for General Use; and I do hereby declare the following to be a full, clear, and exact description of the invention, such as will enable others skilled in the art to which it appertains to make and use the same.

My invention consists in a new and improved washer which will effectually lock a nut on a bolt, so that it will be impossible for it to work or rattle loose, and my invention will be hereinafter fully described and claimed.

Referring to the accompanying drawings, Figure 1 is a side view of a bolt, with its nut, on which my new and improved washer is shown and arranged. Figs. 2 and 3 are detail views showing the inner faces of nuts which may be used with my washer. Fig. 4 is a plan view of the outer side of my washer. Fig. 5 is a similar view of the inner side of my washer.

The same letters of reference indicate corresponding parts in all the figures.

Referring to the several parts by letter, A indicates a bolt of ordinary construction, which I have here shown in connection with my invention, B indicating the threaded part of the bolt.

My new and improved washer, which locks the nut on the bolt so that it cannot rattle or work loose, is made in the form of a disk E, with a central opening I, through which the bolt passes. On one side I form this disk with projecting points or teeth G, the number of which may be varied, these points being struck up out of the metal and left slightly inclined, as shown, so that any movement to unscrew the nut will press the points more firmly into the wood or metal, against which the inner face of the washer bears.

On the outer side of the washer I strike up a spring-tongue H, which is of a thickness about half of that of the washer, whereby it will be seen that the strength of the washer will not be materially impaired, while the resiliency of the tongue will be increased. By reason of the tongue H not being cut through the washer, it will be further perceived that not only is the rigidity of the washer preserved, but the liability of the same spreading and falling off the bolt is obviated.

In Figs. 1 and 2 I have shown a nut having its inner face formed with the radial inclined teeth F, extending out to its outer edge, and in Fig. 3 the inner face of the nut is shown formed with the ring of inclined teeth. Both of these constructions are old, and I merely show them in connection with my washer to illustrate its action.

In operation, my washer being put on the bolt A, the nut is screwed tight home against the washer, when the point of the spring-tongue H will engage with the straight faces of the inclined teeth on the nut where that form of nut is used, and as the points G prevent the washer from turning on the bolt the nut will thus be effectively locked on the bolt, and it will be impossible for it to work or rattle loose. Where an ordinary nut with a plain inner face is used my washer will with the same sharpened tongue bite into the inner face of the nut, and the nut will thus be effectually locked.

I am well aware of the patent granted to one Adgate February 29, 1876, No. 174,175, which shows tongues struck up from the body of a washer and of a corresponding thickness to said body, and I therefore make no claim to the same; but

What I claim, and desire to secure by Letters Patent, is—

As an improved article of manufacture, the flat washer described having points or projections struck up out of one of its sides, and the spring-tongue H, of less thickness than the thickness of the washer, cut or raised up out of its opposite side without cutting through the thickness of the washer, substantially as specified.

In testimony whereof I have affixed my signature in presence of two witnesses.

WILLIAM A. GALBRAITH.

Witnesses:
A. B. SMITH,
JOHN CHAMBERLIN.